(12) United States Patent
Alfonseca et al.

(10) Patent No.: US 8,825,571 B1
(45) Date of Patent: *Sep. 2, 2014

(54) MULTIPLE CORRELATION MEASURES FOR MEASURING QUERY SIMILARITY

(71) Applicant: Google Inc., Mountain View, CA (US)

(72) Inventors: Enrique Alfonseca, Horgen (CH); Massimiliano Ciaramita, Zurich (CH); Keith B. Hall, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,715

(22) Filed: Jun. 4, 2013

Related U.S. Application Data

(63) Continuation of application No. 12/770,844, filed on Apr. 30, 2010, now Pat. No. 8,478,699.

(51) Int. Cl.
 *G06N 5/02* (2006.01)
(52) U.S. Cl.
 CPC ..................................... *G06N 5/022* (2013.01)
 USPC .......................................................... 706/12
(58) Field of Classification Search
 None
 See application file for complete search history.

(56) References Cited

U.S. PATENT DOCUMENTS

| | | | |
|---|---|---|---|
| 8,090,709 B2 | 1/2012 | Liu et al. | |
| 2005/0102614 A1* | 5/2005 | Brockett et al. | 715/513 |
| 2008/0071740 A1* | 3/2008 | Jhala et al. | 707/3 |
| 2008/0140699 A1 | 6/2008 | Jones et al. | |
| 2009/0024613 A1* | 1/2009 | Niu et al. | 707/5 |
| 2009/0198672 A1 | 8/2009 | Jones et al. | |
| 2010/0010895 A1 | 1/2010 | Gabrilovich et al. | |
| 2010/0325133 A1 | 12/2010 | Rounthwaite et al. | |

OTHER PUBLICATIONS

Chien et al, Semantic Similarity Between Search Engine Queries Using Temporal Correlation, 2005.*
Cui et al., Probabilistic Query Expansion Using Query Logs, May 2002.
Ho et al., Decision Combination in Multiple Classifier Systems, Jan. 1994.
Jones et al., Generating Query Substitutions, May 2006.
Kim et al., A comparison of collocation-based similarity measures in query expansion, Jan. 1999.
Chien et al, Semantic Similarity Between Search Engine Queries Using Temporal Correlation, May 2005.
Udupa et al, Mining Named Entity Transliteration Equivalents from Comparable Corpora, Oct. 2008.

* cited by examiner

*Primary Examiner* — Jeffrey A Gaffin
*Assistant Examiner* — Mikayla Chubb
(74) *Attorney, Agent, or Firm* — Fish & Richardson P.C.

(57) ABSTRACT

Methods, systems, and apparatus, including computer programs encoded on a computer storage medium, for determining query suggestions from multiple correlation measures. In one aspect, a method includes receiving a first query and second queries, each of the first and second queries including one or more terms; for each second query and a linear model, receiving correlation scores measuring the correlation between the first query and the respective second query, each correlation score received from a respective correlation process, and each respective correlation process being different from the other respective correlation processes, and applying the linear model to the plurality of correlation scores to determine a combined correlation score that quantifies a combined correlation between the first query and the respective second query based on the plurality of correlation scores. The second queries are ranked in an order according to their respective combined correlations scores.

20 Claims, 5 Drawing Sheets

MULTIPLE CORRELATION MEASURES FOR MEASURING QUERY SIMILARITY

BACKGROUND

This specification relates to digital data processing, and particularly to computer-implemented search services.

Query suggestion is a search service that helps users reformulate queries to better describe their information needs and reduce the time needed to find information that satisfies their needs. Search services provide search query suggestions as alternatives to search queries input by the users. For example, a search engine can provide a query input field that receives an input search query. In response to receiving search query terms input in the query input field, a search service can provide to the user search query suggestions for the input search query terms. A user can select a search query suggestion for use as a search query.

Conventional search services provide search query suggestions that are particular to a correlation measure used by the search service that generated the search query suggestions. For example, some correlation measures are based on search results returned by queries, others are based on temporal usage patterns. Some conventional search services provide query suggestions that are specifically directed at searching a particular type of resource, for example, images, videos, or web pages. Query suggestions provided based on one correlation measure usually differ from query suggestions provided based on another correlation measure.

SUMMARY

In general, one innovative aspect of the subject matter described in this specification can be embodied in methods that include the actions of receiving a first query and a plurality of second queries, each of the first and second queries including one or more terms, and for each second query and a linear model, receiving a plurality of correlation scores measuring the correlation between the first query and the respective second query, each correlation score received from a respective correlation process, and each respective correlation process being different from the other respective correlation processes, applying the linear model to the plurality of correlation scores to determine a combined correlation score that quantifies a combined correlation between the first query and the respective second query based on the plurality of correlation scores; and ranking the plurality of second queries in an order according to their respective combined correlations scores. Other embodiments of this aspect include corresponding systems, apparatus, and computer programs, configured to perform the actions of the methods, encoded on computer storage devices.

These and other embodiments can each optionally include one or more of the following features. The linear model is selected from a group consisting of a logistic regression model, a linear model, and a log-linear model. The methods can further include the action of training the linear model based on annotated queries using a machine learning process. The ranking is a Boolean classification indicative of a semantic relevance of the second query with respect to the first query.

In general, another aspect of the subject matter described in this specification, wherein the plurality of correlation scores measuring the correlation between the first query and the respective second query include a first correlation score, can be embodied in methods that include determining the first correlation score, including the actions of, for each respective query included in the first query and the respective second query, selecting, for each query term in the respective query, context terms from terms included in a corpus, wherein each context term is selected based on a distance metric between the query term included in the respective query and the terms included in the corpus, generating, for each query term in the respective query, a context vector associated with the query term, the context vector having a plurality of context vector elements, each context vector element corresponding to a term included in the corpus, and, for each context vector, determining, for each context vector element corresponding to a selected context term in the context vector, a frequency value based on a measure of occurrence of the selected context term in the context terms selected for the query term associated with the context vector, and generating a query vector for the respective query based on the context vectors for each query term in the respective query, the query vector having a plurality of query vector elements, each query vector element corresponding to a term in the corpus, and each query vector element having a value based on the values of the corresponding vector elements in the context vectors, and determining, from the query vectors for the first query and the respective second query, the first correlation score.

These and other embodiments can each optionally include one or more of the following features. The first correlation score is one of a cosine similarity, a dot-product, mutual information, Jensen Shannon divergence, or dice coefficient. The methods can further include the action of determining a conditional independence for each query based on the query vector generated for the query. The conditional independence is determined based on a statistical test selected from a group consisting of a test based on term-frequency/inverse-document-frequency (tf-idf), a test based on mutual information, a $\chi^2$ test, a t-student test, a test based on pointwise mutual information (PMI), and a G-test. Each distance metric is based on a number of terms between the query term and the corpus terms. The number of terms between the query term and the corpus terms is 3 or less. The corpus comprises Internet resources. The Internet resources include one or more of a search query log, a collection of news articles, a collection of blog entries.

Particular embodiments of the subject matter described in this specification can be implemented so as to realize one or more of the following advantages. The methods and systems described in this specification are not only applicable in the field of search query suggestion, but also in other fields, such as sponsored search. For example, when advertisers are required to provide keywords that should match user queries for their advertisements to be displayed, the methods and systems disclosed in this specification provide advertisers with alternative keywords that are related to, and more relevant than, the ones they have entered.

The combination of temporal correlation and corpus-based similarity metrics facilitates generating improved query suggestions. Further, also general-purpose textual corpora can be used to generate query suggestions; such corpora are more freely available and offer a greater diversity of potential suggestions when compared to search query logs alone. Textual corpora are also available for time periods preceding the widespread use of search engines (and, therefore, preceding the availability of query logs).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
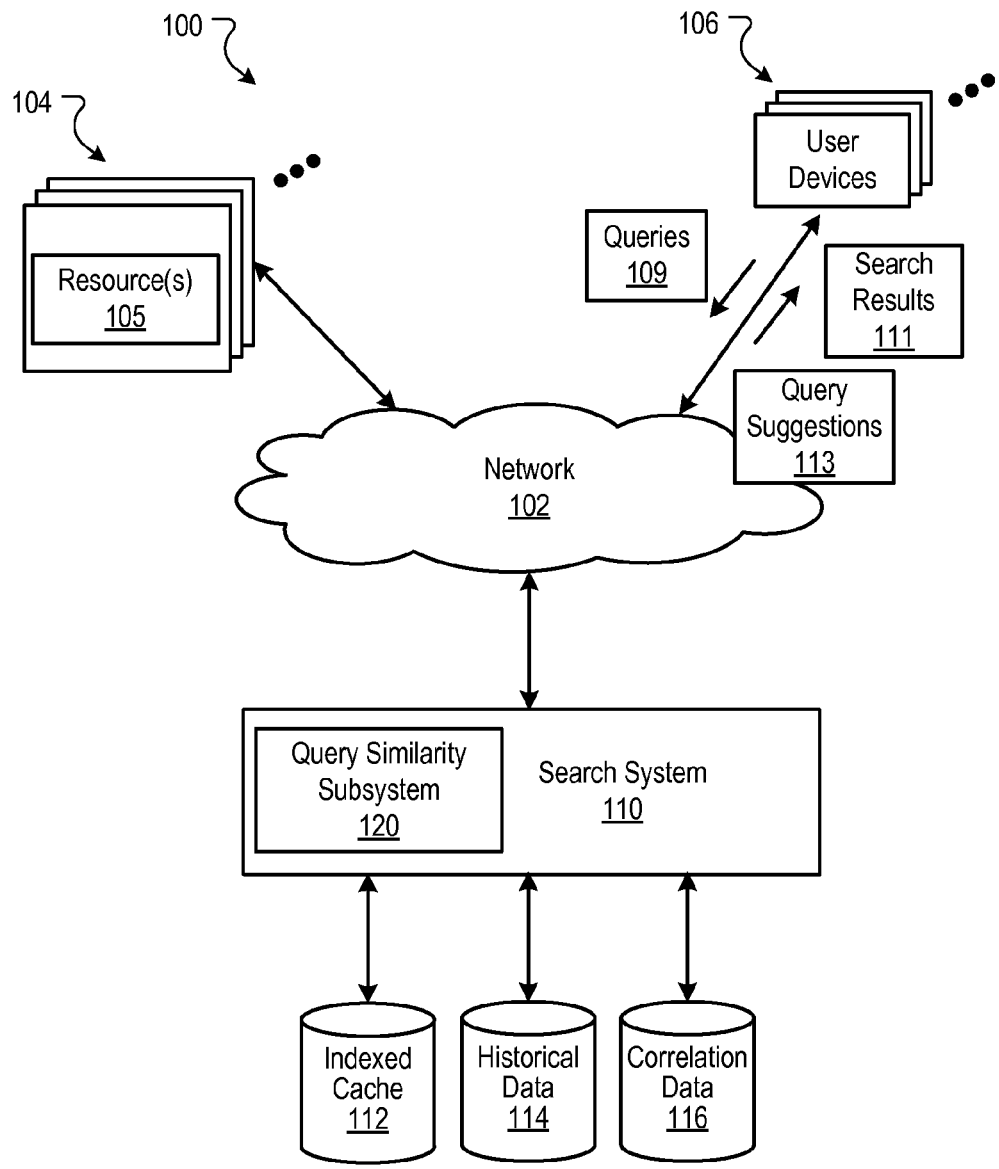
FIG. 1A is a block diagram of an example environment in which a search system provides search services.

FIG. 1A is a block diagram of an example environment 100 in which a search system provides search services. The example environment 100 includes a network 102, for example, a local area network (LAN), a wide area network (WAN), the Internet, or a combination of them, that connects web sites 104, user devices 106, and the search system 110. The environment 100 may include a large number of web sites 104 and user devices 106.

A web site 104 is one or more resources 105 associated with a domain name and hosted by one or more servers. An example web site is a collection of web pages formatted in the hypertext markup language (HTML). Web pages can contain text, images, multimedia content, and programming elements (e.g., scripts). A web site 104 is generally maintained by a publisher, for example, an entity that manages and/or owns the web site.

A resource 105 is any data that can be provided over the network 102 and that is associated with a resource address. Resources 105 include, for example, HTML pages, word processing documents, portable document format (PDF) documents, images, video, and feed sources. The resources 105 may include content, for example, words, phrases, images and sounds and may include embedded information (e.g., meta information and hyperlinks) and/or embedded instructions (e.g., JavaScript programming code). A resource may, but need not, correspond to a file.

A user device 106 is an electronic device that, in operation, is under the control of a user and is capable of requesting and receiving resources 105 over the network 102. Example user devices 106 include personal computers, mobile communication devices, and other devices that can send and receive data over the network 102. A user device 106 typically includes a user application, for example, a web browser or WAP browser, to facilitate sending and receiving of data over the network 102.

To facilitate searching of resources 105, the search system 110 identifies resources 105 by crawling and indexing the resources 105 provided on web sites 104. Data about the resources 105 can be indexed based on the resource to which the data corresponds. Indexed and cached copies of the resources 105 are stored in an indexed cache 112.

The user devices 106 submit search queries 109 to the search system 110. In response, the search system 110 identifies responsive resources 105 and generates search results 111 that identify the responsive resources 105 and returns the search results 111 to the user devices 106. Each search result 111 identifies a resource 105 that is responsive to a query and includes a link to the resource 105. A search result 111 can include a web page title, a snippet of text or a portion of an image (or thumbnail of the image) extracted from the web page, and the URL of the web page.

In response to receiving a search query 109, the search system 110 accesses historical data 114 and correlation data 116 to identify alternative search queries that are similar to the search query 109 and provides query suggestions 113 to the user device 106.

The user device 106 receives the query suggestions 113, for example, in the form of a collection of one or more alternative search queries, and renders the query suggestions 113 as items contained in a drop-down list element, displayed in combination with an input box element located on a rendered web page or within a browser window. In other implementations, the query suggestions 113 can be presented with the search results 111. For example, the query suggestions 113 can be presented as a list of suggestions rendered at the bottom of a page of search results 111.

In response to a user selecting an alternative search query from among the query suggestions 113, the user device 106 submits the alternative search query to the search system 110 over the network 102. The search system 110 provides search results 111 and, optionally, one or more additional query suggestions 113, in response to the alternative search query.

The user device 106 receives the search results 111, for example, in the form of one or more web pages, and render the search results for presentation to users. In response to the user selecting a link in a search result at a user device 106, the user device 106 may request the resource 105 identified by the link. The web site 104 hosting the resource 105 receives the request for the resource from the user device 106 and provides the resource 105 to the requesting user device 106.

In some implementations, the search system 110 provides search results 111 and query suggestions 113 independent from each other. For example, the search system 110 receives, in addition to a partial query term, each character, number, or symbol of the partial query term or additional query terms of search query 109 as they are entered by the user. In another example, the search system 110 receives, in addition to at least one query term, each additional query term of search query 109 as they are entered by the user. In response to the partially entered search query 109 (e.g., the partial query term or terms), the search system provides query suggestions 113 to the user device 106.

Data for the search queries 109 submitted during user sessions are stored in a data store, for example, the historical data store 114. For example, for search queries that are in the form of text, the text of the query is stored in the historical data store 114. Additionally, query suggestions 113 and the queries 109 for which the query suggestions 113 were provided can also be stored in the historical data store 114.

Selection data specifying actions taken in response to search results provided in response to each search query are also stored in the historical data store 114. These actions can include whether a search result 111 was selected, and for each selection, for which search query 109 the search result 111 was provided. These actions can also or alternatively include whether a query suggestion 113 was selected, and for each selection, for which search query 109 the query suggestion 113 was provided.

The search system 110 includes a query similarity subsystem 120 to determine similarity measures that quantify or indicate the similarities between two search queries. Although described as a subsystem, the query similarity subsystem 120 can be implemented as an entirely separate system in data communication with the search system 110.

The query similarity subsystem 120 can be used to offer multiple different features.

Users of a search engine need to come up with a suitable search query in order to fulfill their information needs. Sometimes ambiguous terms are used, which results in documents that relate to different subjects and information relating to the ambiguous terms. Consider, for example, the different meanings of the word "bank". In one context, the term relates to a financial institution in the topic of finance; yet in another context, the term relates to a maneuver in the topic of aviation. Absent additional relevant terms being included in the query, the resources identified may relate to many different subjects. A related problem arises in other scenarios where short texts similar to search queries are required. For example, advertisers are required to provide keywords that should match user queries for their advertisements to be displayed. Query suggestion systems can also help advertisers by suggesting keywords that are related to the ones they have entered.

Further, when search engines determine that, with high probability, the results shown in response to a user's query could be greatly improved by extending or replacing the user query with a related query, such a replacement can be effected automatically, for example, invisible to the user. In such cases, the results corresponding to a suggested query, or corresponding to a combination of the original and the suggested queries, can be shown. Similarly, advertiser keywords can be automatically extended with synonyms, in order to increase the set of user queries that match an advertiser campaign. These processes are commonly known as query expansion and expanded broad match, respectively. Another application involves query categorization. Here, given a predefined set of categories, the search engine determines, for example, the top five categories to which a query can be assigned.

The system 110, for example using the query similarity subsystem 120, can provide correlation or similarity measures that can be used for query suggestion, query expansion, expanded broad match, and query categorization.

A query term can be a unigram or an n-gram, i.e., a query term can contain one or more terms. For example, a term can be a unigram (e.g., "burger") or an n-gram (e.g., "New York", a bigram, or "New York City", a trigram). A query term containing multiple terms can also be referred to as a phrase.

Figure 1B:
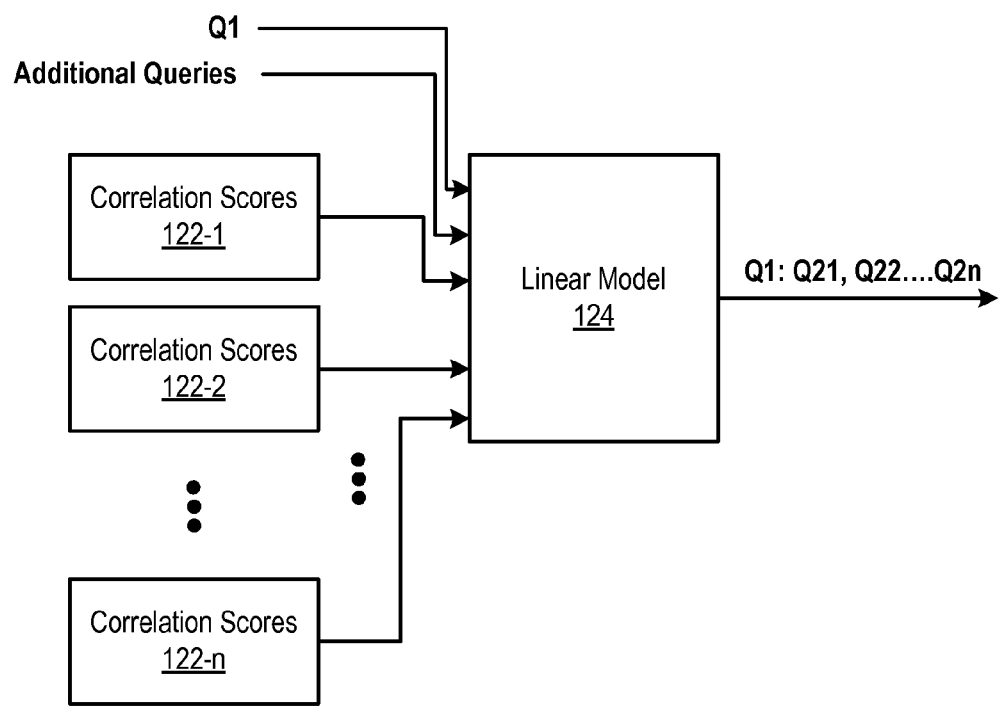
FIG. 1B is a block diagram of an example query similarity system that can be used in the search system of FIG. 1A.
Figure 2:
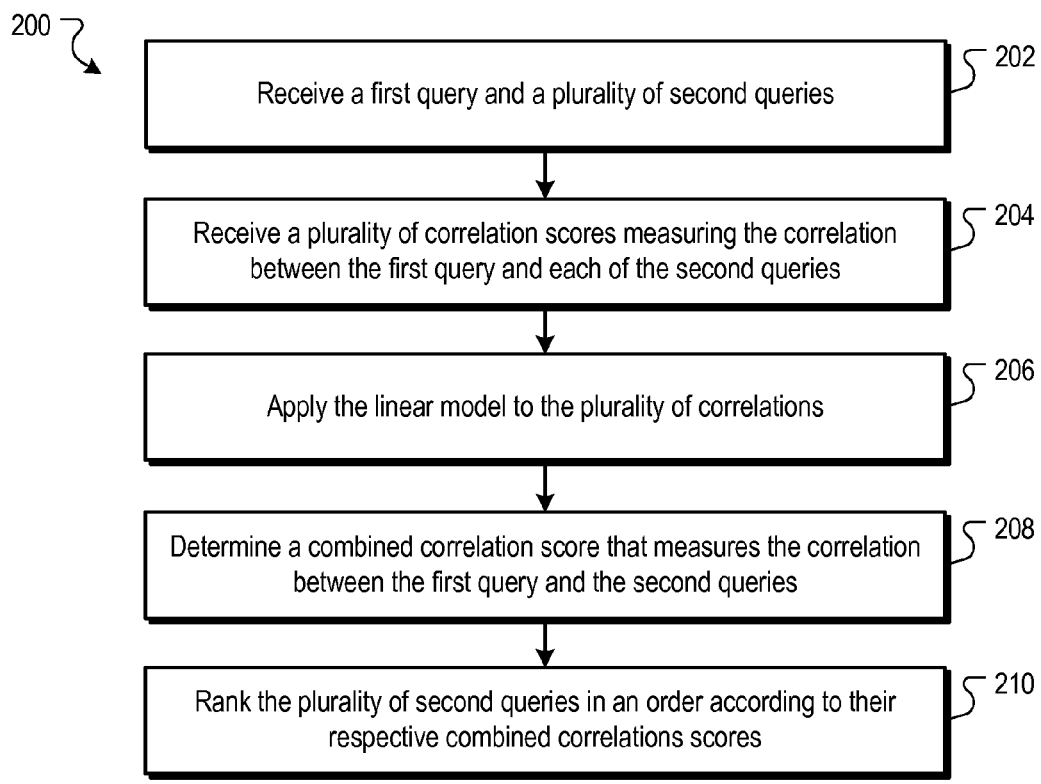
FIG. 2 is a flow chart of an example process for ranking multiple search queries based on a combined correlation score of each of the multiple search queries.

FIG. 1B is a block diagram of an example query similarity system 120 that can be used in the search system of FIG. 1A. The operation of the query similarity system 120 is described with reference to FIG. 2, which is a flow chart of an example process 200 for ranking multiple search queries based on a combined correlation score of each of the multiple search queries.

The system 120 receives a search query and multiple additional search queries (202). The search query and additional queries can be received, for example, from historical data 114 as shown in FIG. 1A. Each of the additional search queries includes one or more query terms (e.g., words or word combinations).

For each additional search query, the process 200 receives multiple correlation scores 122 that measure the correlation between the search query and the respective additional search query (204). Each correlation score is received from a respective correlation process, and each respective correlation process is different from the other respective correlation processes. The multiple correlation scores 122 can include, for example, a correlation score determined based on the temporal series of the appearance of terms in a textual corpus or of queries in a query log. Further, the multiple correlation scores 122 can include a correlation score determined based on distributional similarity, for example, term-occurrence in a textual corpus, syntactic dependencies in the corpus, or contextual windows in which terms appear. One example correlation process provides a correlation score based on a correlation of the temporal series of two search queries using normalized frequencies in a search query log during specific time intervals (e.g., time series similarity). Another correlation process provides a correlation score based on co-occurrence statistics determined using a corpus analysis (e.g., distributional similarity). Other correlation scores can be determined, for example, based on a cosine similarity, a dot-product, mutual information, Jensen Shannon divergence, or a dice coefficient. An implementation of a correlation process is described below, with respect to FIG. 4.

The process 200 applies (206) the linear model to the multiple correlation scores to determine (208) a combined correlation score that measures the correlation between the search query and the additional search query based on the multiple correlation scores. The linear model 124 can be, for example, a logistic regression model or a log-linear model. Other models can be used.

The combination of different correlation scores, each of which are determined based on different processes, facilitates the training of the linear model 124 to calculate a combined correlation score that more closely matches quality control data, such as human evaluated query suggestions for queries. In particular, a combined correlation based on time series similarity and a distributional similarity improves the quality of the generated suggestions, relative to the quality of suggestions based on any one correlation process. The training of the linear model is described with respect to FIG. 3 below.

The process 200 ranks the multiple additional search queries in an order according to their respective combined correlations scores.

Figure 3:
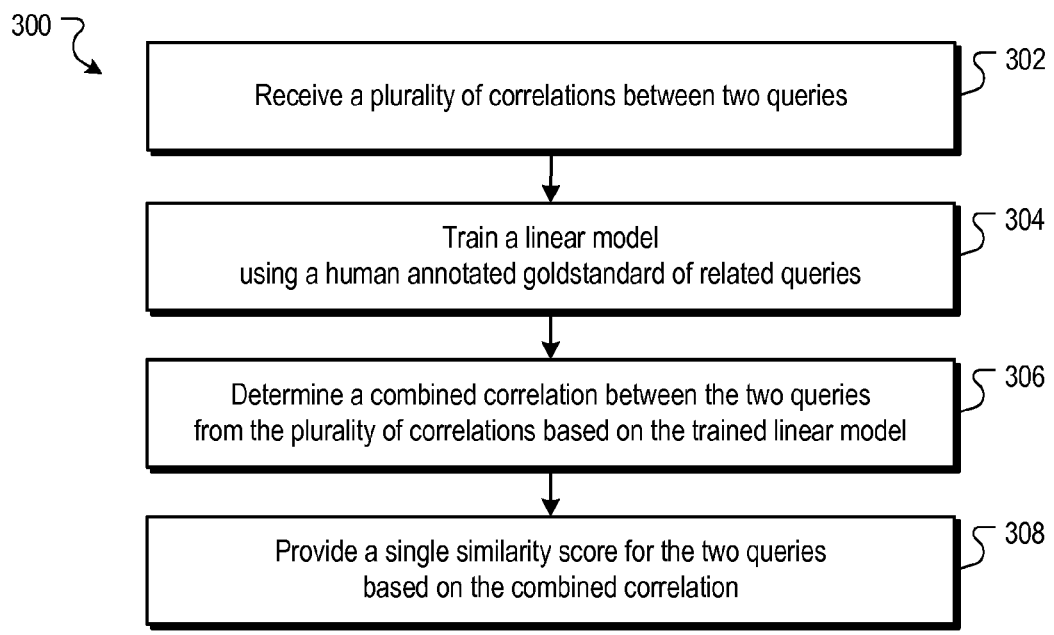
FIG. 3 is a flow chart of an example process for determining a correlation score for multiple search queries.

FIG. 3 is a flow chart of an example process 300 for training a linear model 124 for combining multiple correlation scores of a search query. The process 300 can be implemented in the query similarity subsystem 120.

The process 300 receives multiple correlation scores between two search queries, each correlation score indicative of a similarity of the two search queries (302). Examples of different correlation scores are described below. The correlations scores can be generated by the various correlation processes described below, and stored in a data store that is later accessed by the query similarity subsystem 120.

The process 300 trains the linear model using a machine learning process or algorithm based on human annotated data (304). For example, a machine learning process can provide a Boolean classification indicative of a semantic relevance of the additional search queries with respect to the search query, or provide a ranking of several suggestions for a search query. In one example, the human annotated data are generated based on a query suggestion data set containing a set of sample search queries and, for each query, a set of candidate query suggestions. Each query suggestion is rated by human raters using a 5-point Likert scale, ranging from irrelevant to highly relevant. The linear model 124 is trained to provide a ranking of the suggestions that most closely resembles the scores given by the human raters.

In some implementations, the evaluation is based on information retrieval (IR) metrics, for example, precision at 1, 3, and 5, and mean average precision. This means that not all retrieved documents are taken into account, but a specific cut-off rank (e.g., 1, 3, or 5) is chosen, so that only the topmost results returned by the system are considered. In order to compute the precision- and recall-based metrics, a binary distinction from the ratings is inferred (e.g., related or not related). In one implementation the system trains the linear model by combining two different correlation scores (e.g., time series similarity and distributional similarity), using 10-fold cross validation.

The process 300 determines a combined correlation score based on the trained linear model (306) and provides the combined correlation score of the two search queries (408).

A context vector (e.g., a vector holding context terms and/or term frequencies) for a query can be collected by identifying the contexts in which the query appears. Queries such as "buy a book" and "buy some books" appear close to similar context words in a bag-of-words model and have a high similarity. However, with increasing length of the queries, the probability of finding exact queries in the corpus decreases, so that meaningful statistics about the contexts of the queries cannot be collected. Also, many user queries are simply a concatenation of keywords with a weak underlying syntax, or none at all. Such concatenations may not appear as such in well-formed text found in, for example, web documents, even though the concatenations constitute popular queries. A context vector can also be determined for each term in a query by identifying context terms (e.g., terms appearing in the context of the respective query term).

Figure 4:
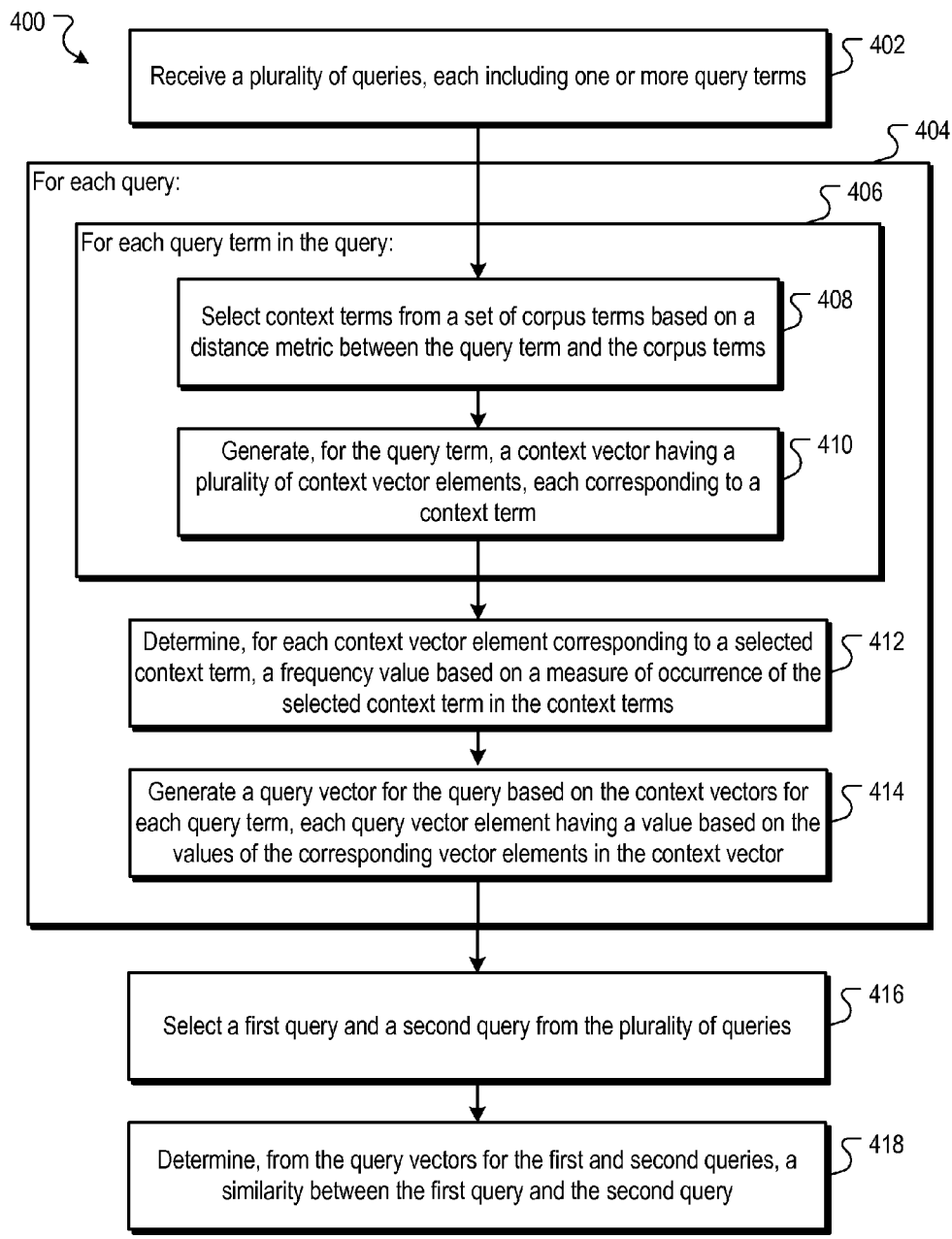
FIG. 4 is a flow chart of an example process for training a linear model for combining multiple correlation scores of a search query.

FIG. 4 is a flow chart of an example process 400 for determining a correlation score for multiple search queries. The example process 400 can be implemented in the search system 110, for example, in the query similarity subsystem 120 of FIGS. 1A and 1B. For convenience, the process 400 is described with respect to a system that performs process 400. In this implementation, the process for determining the correlation score is based on co-occurrence statistics using a corpus analysis.

The process 400 receives multiple search queries, each search query including one or more query terms (402). For example, given a query as $p=[w_1, w_2, \ldots, w_n]$, n is the number of query terms $w_i$ in the query. Generally, a search query can be regarded as a number of terms that may or may not form a grammatically correct sentence. Examples for search queries include: "Sir Arthur Conan Doyle Books" and "hotel cheap New York fares".

The process 400 then performs a number of steps (406, 408, 410, 412, 414) for each query (404). This includes performing (406) the steps of selecting (408) context terms and generating (410) context vectors for each query term included in each query.

For each query term $w_i$ in a query, the process 400 selects context terms from terms included in a corpus, where each context term is selected based on a distance metric between the respective query term and the terms included in the corpus (408). Therefore, for each query term $w_i$, all terms that appear close to $w_i$ are collected. The distance metric can be a number of terms located between the query terms and the corpus terms. In one example, the number of terms located between the query terms and the corpus terms is 3 or less. Other values or other distance metrics can be used.

The corpus can be any suitable large and structured set of text (e.g., web documents, news articles, etc.). In one example, a corpus of hundreds of millions of documents crawled from the Internet is used to collect the contextual features for terms and phrases.

For each query term $w_i$ in the query, the process 400 generates a context vector $\vec{v}_i$ (410). Each context vector $\vec{v}_i$ has multiple context vector elements, each corresponding to a term included in the corpus.

The process 400 determines for each context vector element a frequency value $f_{i1}, f_{i2}, \ldots, f_{i|V|}$ (412), where $|V|$ is the size of the corpus used, based on a measure of occurrence of the selected context term in the context terms. Thus, the vector of frequencies for each term $w_i$ in the query is given as $\vec{v}_i = [f_{i1}, f_{i2}, \ldots, f_{i|V|}]$.

The process 400 generates a query vector $\vec{qv}$ for the query based on the context vectors $\vec{v}_i$ for each query term in the query (414). The query vector $\vec{qv}$ has multiple query vector elements, each corresponding to a term in the corpus and each having a value based on the values of the corresponding vector elements in the context vectors. In some implementations, each query vector element has a value based on the geometric mean of corresponding vector elements in the context vectors, determined as $$\vec{qv} = \left( \left( \prod_{i=1}^{n} f_{i1} \right)^{\frac{1}{n}}, \left( \prod_{i=1}^{n} f_{i2} \right)^{\frac{1}{n}}, \ldots, \left( \prod_{i=1}^{n} f_{i|V|} \right)^{\frac{1}{n}} \right).$$

Here, the geometric mean is used to approximate a Boolean "AND" operation between the vectors and to keep track of the magnitude of the product of the frequencies. Therefore, if two queries only differ on a very general word (e.g. "buy books" or "some books"), the vector associated to the general words ("buy" or "some" in the example) will have non-zero values for most of the contextual features, because they are not topically constrained. Further, the vectors for the queries will have similar sets of features with non-zero values. Additionally, terms that are related will appear in the proximity of a similar set of words and will have similar vectors. For example, if the two queries are "Sir Arthur Conan Doyle books" and "Sir Arthur Conan Doyle novels", given that the vectors for books and novels are expected to have similar features, these two queries will receive a high similarity score. Also, this query vector reduces word ambiguity. For example, for the query "bank account", the vector for bank will contain words related to the various contexts (e.g., account (finance), river (geographic), maneuver (aviation), etc. However, when combining the vector with the vector for "account", the majority of non-zero frequencies that remain relate to terms that belong to the financial category and that are shared between the two vectors. Only these terms will be included in the final query vector.

In some implementations, the process 400 determines a conditional independence for each search query based on the query vector $\vec{qv}$ generated for the query. Depending on, for example, a value indicative of the conditional independence of terms, the corresponding frequency values can be adjusted. The frequency values of terms having a high degree of dependence can be adjusted (e.g., for the corpus). For example, the terms "New" and "York" usually exhibit a high degree of dependence because of the frequent occurrence of the bigram "New York". This concept applies to unigrams and n-grams, as the terms "New York" and "City" usually also exhibit a high degree of dependence (because of the frequent occurrence of the trigram "New York City"). The conditional independence can be determined, for example, based on a statistical test, for example, a test based on term-frequency/inverse-document-frequency (tf-idf), mutual information, $\chi^2$, t-student, or pointwise mutual information. The conditional independence can be tested for based on other tests.

The process 400 selects two different queries from the multiple search queries (416) and determines, from the query vectors for the two queries, a similarity measure that is a measurement of the similarity of the two queries (418). The similarity measure can be one of a cosine similarity, a dot-product, a mutual information, a Jensen Shannon divergence, a dice coefficient. Other similarity measures can be used.

In some implementations, the system 120 further selects multiple terms included in a query to form a combined query term and processes combined query terms (i.e., n-grams) in the same way as conventional query terms (i.e., single terms or unigrams). For example, in order to provide relevant results for the search query "hotel cheap New York fares", the terms "New" and "York" are joined into a combined query term, and the constituent terms "New" and "York" are not processed as single terms. In some implementations, the system 120 can also process the constituent terms. This example illustrates the different meanings of terms based on the terms being considered one by one or in combination.

The system can select query terms for combination based on the occurrence of a combined query term within quotes in a search query log and/or as an entry in an encyclopedia or dictionary. Generally, a user can mark search query terms for combination by including some or all of the terms within quotes (e.g., "hotel cheap "New York" fares"). This way, candidates for query term combination can be extracted, for example, from search query logs. Another way to acquire potential candidates for query term combination are entries in an encyclopedia or a dictionary (e.g., an online encyclopedia such as Wikipedia). Generally, any number of query terms can be joined into a combined query term (e.g., "Free Democratic Party of Switzerland"). In some implementations, query terms are combined greedily. Therefore, longer n-grams are preferred and the number of terms in a combined query term is maximized. The system can select query terms for combination based on multiple metrics, for example, the occurrence of combined terms in a search query log and in an encyclopedia. Other metrics can be used exclusively or in combination.

Other correlation processes can include time-based similarity correlation that determines a correlation score by specifying a time interval, dividing the interval into equally spaced subintervals, and representing each phrase of interest as the sequence of frequencies with which the phrase was observed in the subintervals. The system uses as the correlation score the correlation coefficient between the two series, given two phrases and their associated time series.

A further example of a correlation process is based on processing temporal series of occurrence of terms in textual corpora having timestamps. Examples for textual corpora having time stamps are news articles or blog entries. Here, a similarity measure is based on the co-occurrence (i.e., terms occur within the same time period) of terms in different textual corpora.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
   receiving a first query and a plurality of second queries;
   determining a temporal correlation score between the first query and each second query based on a comparison of a temporal series of occurrences of elements of the first query in a first corpus comprising a first document of a first document type and a temporal series of occurrences of elements of the second query in a second different textual corpus comprising a second document of a second document type that differs from the first document type, wherein the comparison is based on the first document and the second document having timestamps in a same time period;
   computing a similarity score for the first query and a second query, the similarity score between the first query and a second query being computed based on the temporal correlation score between the first document and the second document; and
   ranking the second query according to the similarity score.

2. The method of claim 1, further comprising:
   determining a distributional similarity score between the first query and the second query, the determination of the distributional similarity score between the first query and a second query being based on a comparison of first frequencies of terms that co-occur in text with terms of the first query and second frequencies of terms that co-occur in text with terms of the second query,
   wherein computing a similarity score for the first query and a second query comprises providing, as input to a trained model, the distributional similarity score between the first query and each second query and the temporal correlation score between the first query and the second query.

3. The method of claim 2, further comprising determining the distributional similarity score between the first query and each second query comprising:
for the first query and each respective second query:
selecting, for each query term in the respective query, context terms from terms included in a third corpus, wherein each context term is selected based on a distance metric between the query term included in the respective query and the terms included in the third corpus;
generating, for each query term in the respective query, a context vector associated with the query term, the context vector having a plurality of context vector elements, each context vector element corresponding to a term included in the third corpus;
for each context vector, determining, for each context vector element corresponding to a selected context term in the context vector, a frequency value based on a measure of occurrence of the selected context term in the context terms selected for the query term associated with the context vector; and
generating a query vector for the respective query based on the context vectors for each query term in the respective query, the query vector having a plurality of query vector elements, each query vector element corresponding to a term in the third corpus, and each query vector element having a value based on the values of the corresponding vector elements in the context vectors; and
determining, from the query vectors for the first query and each respective second query, the distributional similarity score.

4. The method of claim 3, wherein the distributional similarity score is based on a cosine similarity, a dot-product, a mutual information, a Jensen Shannon divergence, or a dice coefficient.

5. The method of claim 2, further comprising:
determining a query correlation score between the first query and the second query based on a comparison of a temporal series of occurrences of elements of the first query in a query log and a temporal series of occurrences of elements of the second query in the query log,
wherein computing a similarity score for the first query and a second query comprises providing, as input to the trained model, the query correlation score between the first query and the second query, the distributional similarity score between the first query and the second query, and the temporal correlation score between the first query and the second query.

6. The method of claim 5, further comprising:
training the linear model based on annotated queries using a machine learning process.

7. The method of claim 1, wherein ranking the plurality of second queries in an order according to their respective similarity scores comprises determining a Boolean classification of each second query with respect to the first query indicative of a semantic relevance of the second query with respect to the first query.

8. The method of claim 1, wherein the temporal correlation score is based on one of a cosine similarity, a dot-product, a mutual information, a Jensen-Shannon divergence, or a dice coefficient.

9. A system comprising:
one or more computers and one or more storage devices storing instructions that are operable, when executed by the one or more computers, to cause the one or more computers to perform operations comprising:
receiving a first query and a plurality of second queries;
determining a temporal correlation score between the first query and each second query based on a comparison of a temporal series of occurrences of elements of the first query in a first corpus comprising a first document of a first document type and a temporal series of occurrences of elements of the second query in a second different textual corpus comprising a second document of a second document type that differs from the first document type, wherein the comparison is based on the first document and the second document having timestamps in a same time period;
computing a similarity score for the first query and a second query, the similarity score between the first query and a second query being computed based on the temporal correlation score between the first document and the second document; and
ranking the second query according to the similarity score.

10. The system of claim 9, wherein the operations further comprise:
determining a distributional similarity score between the first query and the second query, the determination of the distributional similarity score between the first query and a second query being based on a comparison of first frequencies of terms that co-occur in text with terms of the first query and second frequencies of terms that co-occur in text with terms of the second query,
wherein computing a similarity score for the first query and a second query comprises providing, as input to a trained model, the distributional similarity score between the first query and each second query and the temporal correlation score between the first query and the second query.

11. The system of claim 10, wherein the operations further comprise determining the distributional similarity score between the first query and each second query comprising:
for the first query and each respective second query:
selecting, for each query term in the respective query, context terms from terms included in a third corpus, wherein each context term is selected based on a distance metric between the query term included in the respective query and the terms included in the third corpus;
generating, for each query term in the respective query, a context vector associated with the query term, the context vector having a plurality of context vector elements, each context vector element corresponding to a term included in the third corpus;
for each context vector, determining, for each context vector element corresponding to a selected context term in the context vector, a frequency value based on a measure of occurrence of the selected context term in the context terms selected for the query term associated with the context vector; and
generating a query vector for the respective query based on the context vectors for each query term in the respective query, the query vector having a plurality of query vector elements, each query vector element corresponding to a term in the third corpus, and each query vector element having a value based on the values of the corresponding vector elements in the context vectors; and
determining, from the query vectors for the first query and each respective second query, the distributional similarity score.

12. The system of claim 11, wherein the distributional similarity score is based on a cosine similarity, a dot-product, a mutual information, a Jensen Shannon divergence, or a dice coefficient.

13. The system of claim 10, wherein the operations further comprise:
   determining a query correlation score between the first query and the second query based on a comparison of a temporal series of occurrences of elements of the first query in a query log and a temporal series of occurrences of elements of the second query in the query log,
   wherein computing a similarity score for the first query and a second query comprises providing, as input to the trained model, the query correlation score between the first query and the second query, the distributional similarity score between the first query and the second query, and the temporal correlation score between the first query and the second query.

14. The system of claim 13, wherein the operations further comprise training the linear model based on annotated queries using a machine learning process.

15. The system of claim 9, wherein ranking the plurality of second queries in an order according to their respective similarity scores comprises determining a Boolean classification of each second query with respect to the first query indicative of a semantic relevance of the second query with respect to the first query.

16. The system of claim 9, wherein the temporal correlation score is based on one of a cosine similarity, a dot-product, a mutual information, a Jensen Shannon divergence, or a dice coefficient.

17. A computer program product, encoded on one or more non-transitory computer storage media, comprising instructions that when executed by one or more computers cause the one or more computers to perform operations comprising:
   receiving a first query and a plurality of second queries;
   determining a temporal correlation score between the first query and each second query based on a comparison of a temporal series of occurrences of elements of the first query in a first corpus comprising a first document of a first document type and a temporal series of occurrences of elements of the second query in a second different textual corpus comprising a second document of a second document type that differs from the first document type, wherein the comparison is based on the first document and the second document having timestamps in a same time period;
   computing a similarity score for the first query and a second query, the similarity score between the first query and a second query being computed based on the temporal correlation score between the first document and the second document; and
   ranking the second query according to the similarity score.

18. The computer program product of claim 17, wherein the operations further comprise:
   determining a distributional similarity score between the first query and the second query, the determination of the distributional similarity score between the first query and a second query being based on a comparison of first frequencies of terms that co-occur in text with terms of the first query and second frequencies of terms that co-occur in text with terms of the second query,
   wherein computing a similarity score for the first query and a second query comprises providing, as input to a trained model, the distributional similarity score between the first query and each second query and the temporal correlation score between the first query and the second query.

19. The computer program product of claim 18, wherein the operations further comprise:
   determining a query correlation score between the first query and the second query based on a comparison of a temporal series of occurrences of elements of the first query in a query log and a temporal series of occurrences of elements of the second query in the query log,
   wherein computing a similarity score for the first query and a second query comprises providing, as input to the trained model, the query correlation score between the first query and the second query, the distributional similarity score between the first query and the second query, and the temporal correlation score between the first query and the second query.

20. The computer program product of claim 19, wherein the operations further comprise training the linear model based on annotated queries using a machine learning process.

* * * * *